April 9, 1957    B. M. S. KALLING ET AL    2,788,204
RECUPERATIVE ROLLER-TYPE HEATING FURNACE
Filed Dec. 3, 1953
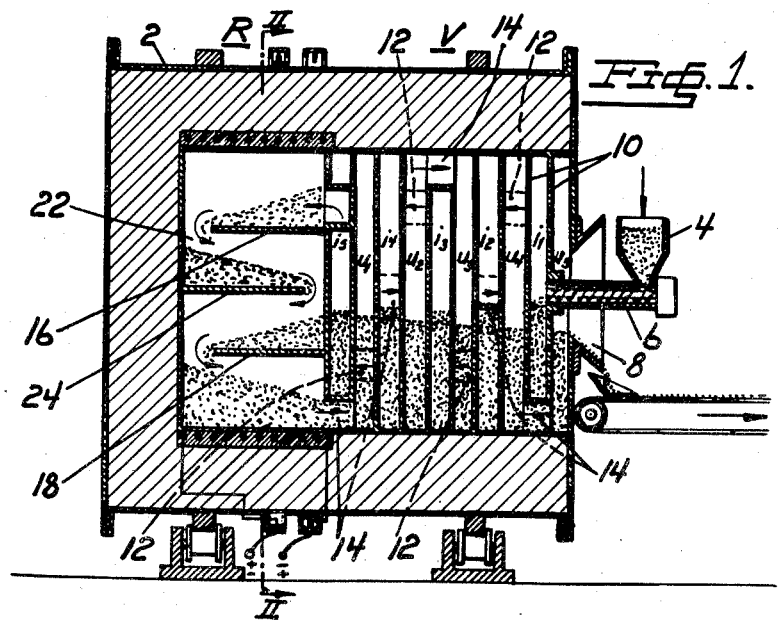
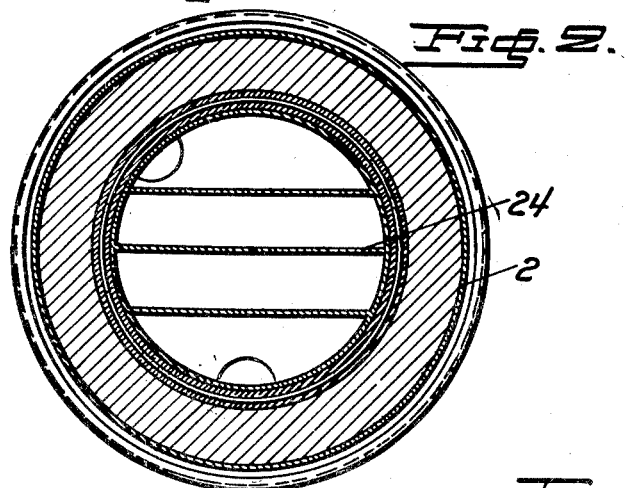
Inventors
Bo Michael Sture Kalling
Folke Carl Evald Johansson
By Pierce, Scheffler & Parker
Attorneys United States Patent Office 2,788,204
Patented Apr. 9, 1957

2,788,204

RECUPERATIVE ROLLER-TYPE HEATING FURNACE

Bo Michael Sture Kalling, Domnarvet, and Folke Carl Evald Johansson, Borlange, Sweden, assignors to Stora Kopparbergs Bergslags Aktiebolag, Falun, Sweden, a Swedish company Application December 3, 1953, Serial No. 396,042

Claims priority, application Sweden December 3, 1952

3 Claims. (Cl. 263—33)

For many chemical and metallurgical processes which must be carried out at high temperatures, the heat required for heating the material to the necessary temperature is a very important and often the predominating part of the total heat requirement. This is also the case in heat treatments at high temperatures. However the energy necessary for the process or heat treatment could be substantially reduced if it were possible to recover the heat content of the treated material, before it is cooled in the air or by means of flowing water. The heat content of the treatetd material is best utilized by being transferred to the material to be heated in a heat exchanger. If, in a heat treatment, exactly the same quantity of material is to be heated and cooled, and the heat of reaction is zero, it would therefore, by means of an effective heat exchange, be possible to add only the heat necessary for compensating for the heat losses of the furnace to the surroundings by convection and radiation.

This principle of utilizing the heat content of the treated material or the reaction products inside or outside the furnace has been used in many furnaces and chemical apparatuses. In most cases, however, only reaction gases and fluids have been used for heating gases, fluids and solid material, or solid reaction products have been used for heating gases or fluids.

The present invention relates to a reaction furnace with a heat exchanger, suitable for heat exchange between fluid phases and between pulverulent or small-sized solid material. The furnace according to the invention comprises a drum, arranged to be rotatable about its substantially horizontal longitudinal axis, a heat treatment chamber being arranged at one end of said drum, and a number of walls being arranged at the other end of said drum, perpendicular to the longitudinal axis, for dividing said end of the drum into a number of smaller chambers. These smaller chambers are alternatingly connected with each other to form two parallel systems of chambers, enabling the material to be fed into the furnace through one of the systems and to be discharged from the furnace through the other system, in countercurrent to the material being fed. The 1st, 3rd, 5th etc. of said smaller chambers, counted from the end of the furnace, are conveniently connected to form the feeding system, and the 2nd, 4th, 6th etc. of said smaller chambers are connected to form the discharge system.

The invention will now be described more in detail with reference to the accompanying drawing which shows diagrammatically and as an example an embodiment of the invention.

In the drawing:

Fig. 1 shows diagrammatically a section of the furnace on a plane through its longitudinal axis.

Fig. 2 shows diagrammatically a section of the heat treating chamber on the line II—II of Fig. 1.

Fig. 3 shows a section of a device in the recuperator part of the furnace, for regulating the depth of filling.

Fig. 4 is a front section of the device shown in Fig. 3.

The figures show a drum 2 which is divided into a heat treatment chamber R, which may also be a reaction chamber, and a heat exchanging (recuperating) part V. At the end of the heat exchanging part V there is provided a feeding device, comprising a hopper 4 with a feeding screw 6, and a discharge opening 8 for the treated material. The heat exchange part V is provided with a series of transverse walls 10, dividing said part V into a great number of smaller parallel chambers. These smaller chambers are alternatingly connected with each other by means of channels 12 and 14 respectively, the chambers thereby forming two systems which are in heat exchange contact, the material to be fed into the heat treating chamber passing the system $i$ and the material to be unloaded leaving through the system $u$. The feeding screw 6 feeds the material into the first chamber $i_1$, the material then, by means of the rotation of the furnace, being fed successively through the channels 12 and the chambers $i_2$, $i_3$ etc., into the heat treatment chamber R, and being then discharged successively through thte channels 14 and the chambers $u_1$, $u_2$, $u_3$ etc. The channels 12 and 14 are situated adjacent the periphery of the drum. As will be understood from the description above, the material being fed will travel in counter-current to the material being discharged, the level of the material in the heat treatment chamber R being somewhat lower than the level in the first small chamber $i$, and the level in the last small chamber $u$ being of course somewhat lower than the level in the heat treatment chamber R. A very good heat exchange will take place during this counter-current travelling, particularly if the walls in the heat exchange part of the furnace are thin. The discharged material will give its heat to the material entering the furnace and will consequently leave the furnace at a low temperature.

In the shown embodiment the channels 12 and 14 have been mounted with an angular displacement. This is not necessary but gives smaller losses by convection and radiation from the furnace and makes it possible to maintain a reducing atmosphere in the heat treatment chamber. It is convenient to make the vertical walls corrugated, in order to improve the heat transmission and to stabilize the construction. For the same purpose, said walls may be provided with welded projections. The heat exchanger and the heat treatment chamber are mounted in a rotating drum and are well insulated therefrom. Combustion gases or exhaust gases from the process may possibly be passed centrally through the heat exchanger or between the mantle and the insulation for the purpose of utilizing their heat capacity.

The end of the heat treating chamber which is opposite to the heat exchanger may be closed or open. In both cases it is possible to let in air or other gas mixtures and to remove the exhaust gas centrally through this end. Additions in fluid or solid phase necessary for regulating the process, may also be added, if desired, from the free end of the furnace.

The depth of filling of the furnace is conveniently regulated by varying the size of the discharge opening 8 in Fig. 1. The furnace is generally mounted with a horizontal longitudinal axis, about which the furnace and the heat exchanger rotate, but it is possible, though not necessary, to give the axis an adjustable slope for regulating the depth of filling.

The chamber R contains two plates 16 and 18, extending spaced apart and from the inner wall of the heat exchanging part V of the furnace, and parallel to each other and to the longitudinal axis of the furnace. The plates 16 and 18 do not extend right to the end wall 20 of the heat treatment chamber but leave a free passage 22 at said wall. Between said plates 16 and 18 there is provided a diagonal plate 24, extending from the wall 20 but not extending right to the wall of the heat exchanging part leaving a free passage 26. The material being fed in will first arrive upon the plate 16, will then fall down upon the diagonal plate 24 and from there to the plate 18, will then be fed towards the end plate 20, and will then pass through the channel 14 into the chamber $u_1$.

Figs. 3 and 4 illustrate a method of increasing the amount of material in the furnace, viz. by means of a guide vane or the like 28, provided in one or more of the channels 12 or 14. Said guide vane is arranged either to raise the level in the next chamber or to retard the discharging of the material.

The heating of the heat treatment chamber may occur in a manner known per se, by means of electricity, combustion or by steam or other heat emitting agents. The heat may be supplied inside the chamber or in the space surrounding the chamber, depending on the nature of the process or the heat treatment.

What is claimed is:

1. A rotary furnace having a heat treatment portion and a heat exchange portion and comprising a drum having its longitudinal axis situated substantially horizontally, means for rotating said drum around its longitudinal axis, partition walls extending perpendicularly to the longitudinal axis of the drum and arranged to form a plurality of parallel recuperator chambers in the heat exchange portion of the furnace, channels connecting every two alternate chambers to form a first series of series-coupled recuperator chambers, channels connecting every remaining two alternate chambers to form a second series of series-coupled recuperator chambers, said channels being adjacent to the outer wall of the drum, means for charging material into the heat treatment portion of the furnace through the first series of recuperator chambers, means for discharging material from the heat treatment portion of the furnace through the second series of recuperator chambers, and means for heating the heat treatment portion of the furnace.

2. A furnace as claimed in claim 1, in which said channels are angularly displaced from each other.

3. A furnace as claimed in claim 1 comprising means in said channels for regulating the flow of material therethrough.

References Cited in the file of this patent

UNITED STATES PATENTS

| | | |
|---|---|---|
| 822,022 | Schaeffer | May 29, 1906 |
| 1,917,942 | Kalling et al. | July 11, 1933 |
| 1,964,402 | Kalling et al. | June 26, 1934 |
| 2,281,168 | Paget | Apr. 28, 1942 |
| 2,363,390 | Buehl | Nov. 21, 1944 |

FOREIGN PATENTS

| | | |
|---|---|---|
| 148,411 | Switzerland | Oct. 1, 1931 |
| 190,480 | Switzerland | July 1, 1937 |
| 687,601 | Germany | Feb. 1, 1940 |